June 26, 1962     J. M. WALTER ETAL     3,040,632
DOUBLE ACTION CUTTING TOOL

Original Filed May 10, 1955

INVENTORS.
John M. Walter.
BY Graham E. Marx.
Wood, Herron & Evans
ATTORNEYS.

June 26, 1962 J. M. WALTER ETAL 3,040,632
DOUBLE ACTION CUTTING TOOL
Original Filed May 10, 1955 3 Sheets-Sheet 2

INVENTORS.
John M. Walter.
BY Graham E. Marx.
Wood, Herron & Evans.
ATTORNEYS.

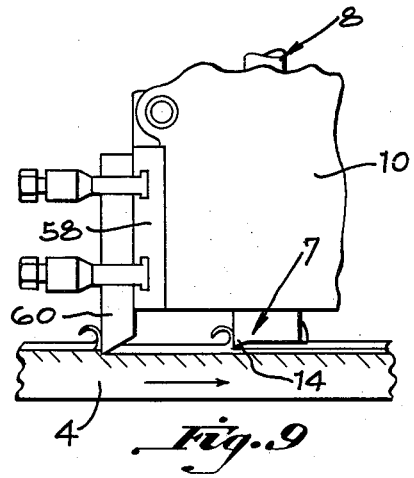
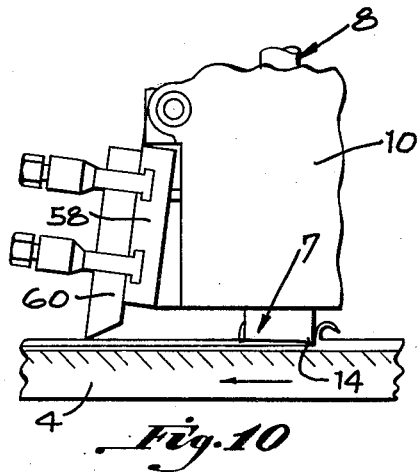
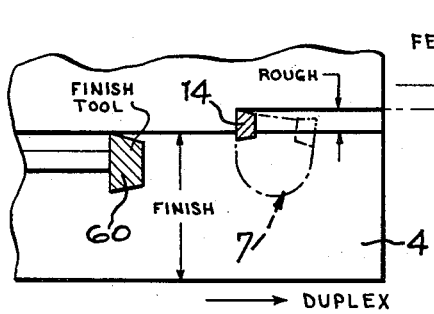
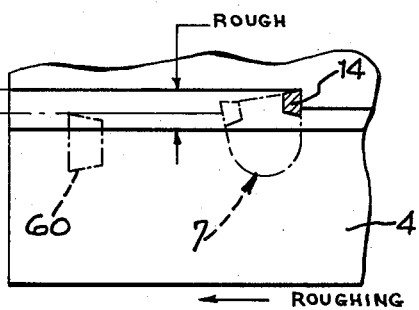
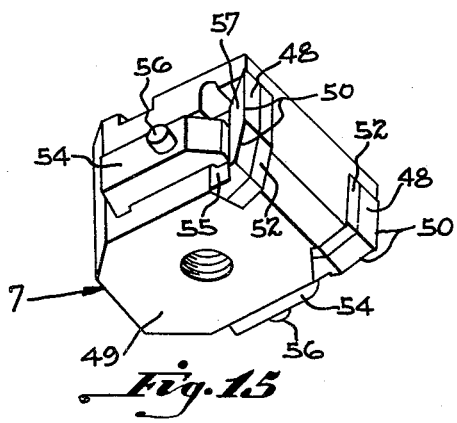
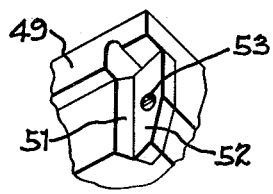

United States Patent Office 3,040,632
Patented June 26, 1962

3,040,632
DOUBLE ACTION CUTTING TOOL
John M. Walter and Graham E. Marx, Cincinnati, Ohio, assignors to The G. A. Gray Company, Cincinnati, Ohio, a corporation of Ohio
Original application May 10, 1955, Ser. No. 507,207, now Patent No. 2,940,368, dated June 14, 1960. Divided and this application July 16, 1959, Ser. No. 827,632
1 Claim. (Cl. 90—53)

This invention relates to cutting tools for machining operations and is directed particularly to a double action tool for planing machines, that is, a tool which provides a planing action during one or both directions of relative travel of the tool and work.

The present application is a division of the co-pending application of John M. Walter and Graham E. Marx for "Machine Tool," Serial No. 507,207, filed on May 10, 1955, now Patent No. 2,940,368, issued June 14, 1960.

In general, a typical metal working planer comprises a bed having a table slidably mounted thereon for power reciprocation in forward and reverse directions along the bed. The machine includes a vertical column at one or both sides of the bed supporting a cross rail transversely above the table, with a rail head slidably mounted upon the cross rail and adapted to be fed along the rail in stepwise fashion in time with the reciprocations of the table.

In operating a conventional planer of this character, utilizing a single action tool, the tool is mounted upon a tool slide or head which is carried by the rail head, and the tool slide is adjusted vertically to bring the cutting edge of the tool to the proper plane with respect to the surface of the workpiece which is clamped upon the table. At the start of the operation, the rail head resides at one side of the workpiece in position to take a cut during motion of the table through its cutting stroke. At the end of the cutting stroke, the tool is fed transversely and the motion of the table is reversed for the return stroke, while the cutting tool is inactive, such that through successive cutting strokes, a planed surface is generated upon the surface of the workpiece. It will be apparent that the return stroke of the table when using a single action cutting tool inherently results in wasted time and impairs the efficiency of a given planing operation since the cutting tool is idling during a large percentage of total operating time.

One of the primary objectives of the present invention has been to provide a cutting tool for effecting a cutting action during both the cutting and return strokes of the table and which presents opposed cutting tools to the surface of the work with the full rigidity of a modern single action tool, thereby to improve the quality of the work produced in a double cutting operation.

In general, the present double acting tool comprises a tool body or holder in the form of a rugged block having opposed recesses in which are mounted two cutting bits facing generally in opposite directions, the cutting bits being alternately presented to the work surface during the forward and return strokes of the table. The arrangement is such that the two cutting bits have cutting edges which alternately reside in the same relative positions but which face generally in opposite directions during the forward and return cutting strokes. In the preferred arrangement, the opposed cutting edges and working faces of the bits reside at right angles to the path of relative motion between the cutting bid and work surface.

As disclosed in the co-pending application, the tool slide upon which the double acting tool is mounted includes opposed stop means located closely adjacent the tool holder and providing abutments which resist the forces generated by the opposed cutting tools during the cutting strokes. By virtue of the heavy metal sections of the tool holder and right angular disposition of the cutting edges, a high degree of rigidity is provided for the support of the opposed cutting tools, so as to eliminate tool chatter and to improve the quality of the work.

In order to bring the opposed cutting edges to operating position, the tool holder is mounted upon a rocking tool shaft journalled in the tool slide upon an axis perpendicular to the longitudinal path of travel of the table, but which is inclined slightly from the perpendicular in a plane which is transverse to the path of travel. The opposed cutting bits are disposed in a position to be alternately brought into cutting position by imparting oscillating or rocking motion to the rock shaft, the tool slide being provided with suitable power mechanism connected to the rocking tool shaft for this purpose.

A further objective of the invention has been to provide a double acting tool having cutting bits which may be repositioned when worn to present unused cutting edges in a convenient manner without requiring the tool holder to be demounted from its mounting shaft.

According to this aspect of the invention, the cutting bits, which are formed from a hard material such as carbide, are accurately seated within respective recesses formed in the tool holder block and are clamped therein by releasable elements such as screws. In one form of the invention, the bit is generally square in configuration and has rounded corners providing four cutting edges which may be presented successively to the work by repositioning the bit. In another form, the cutting bit is generally cylindrical and may be rotated within the recess to present the desired portion of the cutting edge to the work.

As disclosed in the co-pending application, the present tool is also intended for duplex cutting operations wherein a finishing tool is mounted upon a clapper for coaction with the double action tool. During the duplex operation, the double acting tool takes a cut during the forward and return strokes of the table, while the finishing tool takes a skim cut during motion in one direction only, the width of the skim cut being sufficient to finish two previous rough cuts. The double action tool is also used in cross planing and side planing operations, as disclosed in the co-pending application.

The various features and advantages of the invention will be more fully apparent to those skilled in the art from the following detailed description taken in conjunction with the drawings.

In the drawings:

FIGURES 9 and 10 are diagrammatic views showing the rail head equipped with a clapper and finishing tool arranged to coact with the double acting tool in a duplex planing operation.

FIGURES 11 and 12 are diagrammatic views projected from FIGURES 9 and 10, further illustrating the operation of the double acting tool and finishing tool with respect to the workpiece.

FIGURE 15 is a perspective view illustrating a further modification of the cutting tool.

FIGURE 16 is a perspective view of a portion of the tool body of FIGURE 15, showing the recess in which the cutting bit is mounted.

Planing Machine

Figure 1:
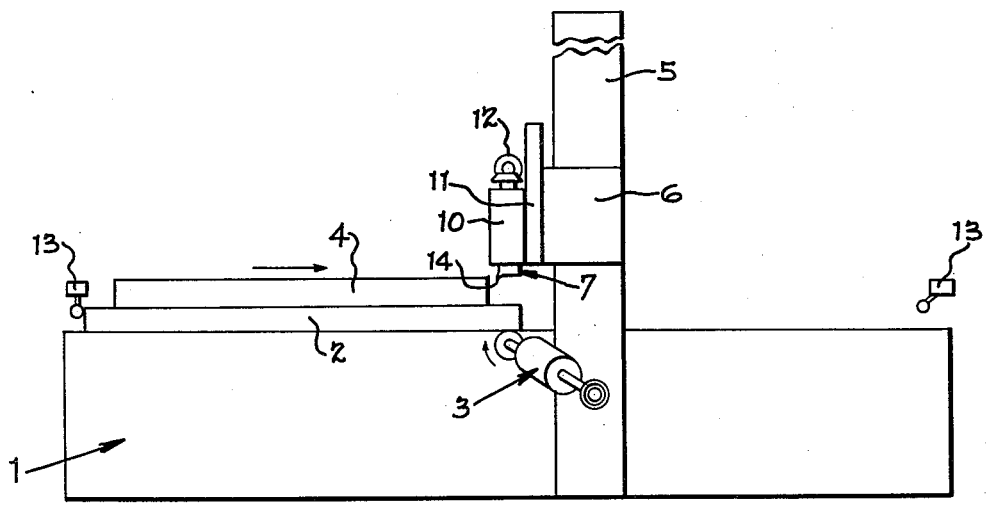
FIGURE 1 is a diagrammatic view of a planing machine utilizing a double action cutting tool according to the present invention, and showing the tool positioned for cutting in one direction of table reciprocation.
Figure 2:
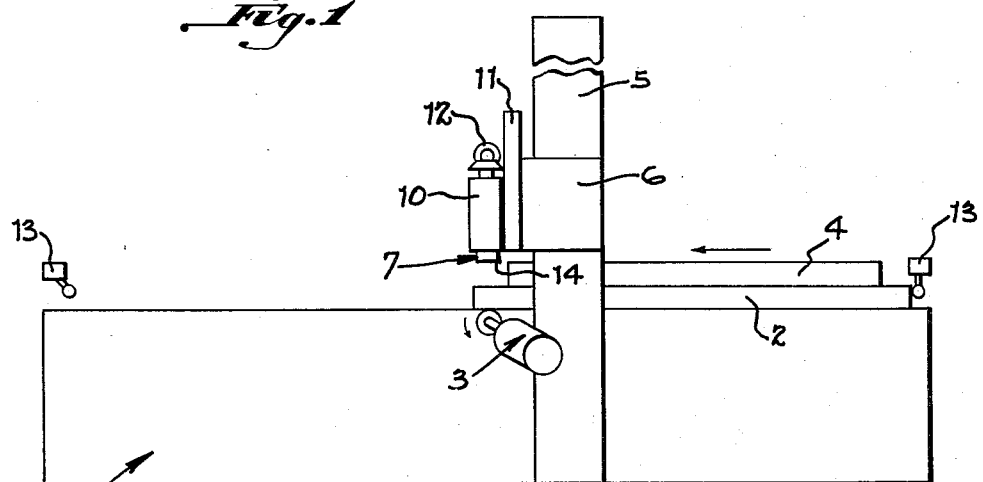
FIGURE 2 is a view similar to FIGURE 1, showing the double action tool positioned for cutting during the return motion of the table.

In order to disclose the structure and operation of the cutting tool of the present invention, the tool is shown in relation to the planing machine illustrated in the aforesaid co-pending application Serial No. 507,207. Referring to FIGURES 1 and 2, the machine comprises an elongated bed 1 having a table 2 which is slidable longitudinally with respect to the top of the bed, as indicated by the arrows. A table motor indicated generally at 3, is in driving connection with the table for reciprocation in forward and reverse directions. The workpiece 4 is mounted upon the upper surface of the table and is secured firmly in place by clamping devices of conventional design which are not shown.

It will be understood at this point that the double acting tool of the present invention is intended for planing operations of various types, as disclosed in the co-pending application, such as longitudinal planing, cross planing or side planing. However, for the purpose of illustrating the principles of the cutting tool, the present disclosure is limited to a longitudinal planing operation, wherein the table is reciprocated longitudinally while the cutting tool is presented to the surface of the workpiece during motion in both directions.

The planer is provided with a vertical column or housing 5 which is secured to the bed at one side, with a cross rail 6 having one end slidably connected to the column by means of suitable vertical slide-ways (not shown). The column also includes a power operated elevating mechanism (not shown) by means of which the cross rail and cutting tool may be adjusted vertically with respect to the table 2. When the rail is adjusted to its proper elevation to the top surface of the work resting upon the table, the rail is clamped rigidly in position upon the column.

The cross rail 6 extends transversely across the bed of the machine and its outer end usually is supported by a demountable column or housing which projects upwardly from the opposite side of bed 2 in alignment with column 5. The demountable column and associated parts form no part of the present invention and for this reason have not been illustrated. When the nature of the work so requires, the demountable column can be removed to convert the planer into an open side machine, in which case cross rail 6 projects in cantilever fashion across the bed of the machine.

Figure 3:
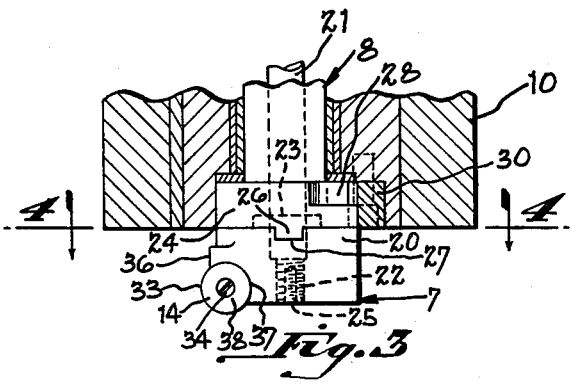
FIGURE 3 is an enlarged fragmentary sectional view showing the lower portion of the tool slide and rocking tool shaft upon which the double action cutting tool is mounted.
Figure 5:
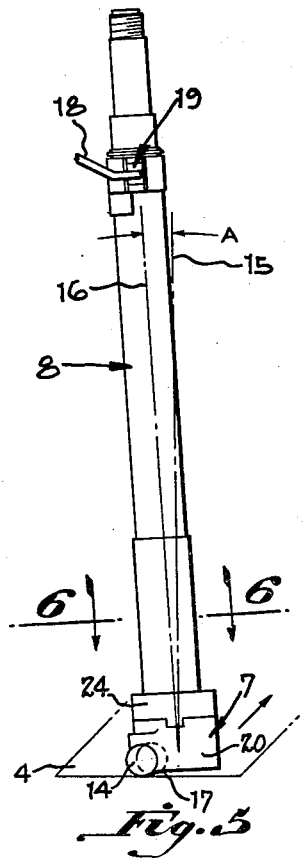
FIGURE 5 is a diagrammatic view illustrating the action of the rocking tool shaft and cutting tool during a cut in one direction of table motion.

The double action cutting tool, which is indicated generally at 7 in FIGURES 1 and 2, is mounted upon a rocking tool shaft 8, as best shown in FIGURES 3 and 5. The shaft 8 is journalled in a tool head or slide 10 (FIGURES 1 and 2) which in turn, is mounted upon a rail head 11 for vertical and angular adjustment relative to the rail head. The cross rail includes a power operated feed mechanism (not shown) for shifting the rail head 11 and tool slide 10 in stepwise advancements, such that the double action tool 7 is fed transversely with respect to the top surface of the workpiece during the planing operation. In order to provide the double cutting action, the tool slide 10 is provided with a reversible stall motor 12 in driving connection with rock shaft 8 for rocking the shaft and double action tool in forward and reverse directions in time with the reciprocations of the table and workpiece. The stall motor 12 may represent either an air motor or one operated electrically or hydraulically. In any case, the motor is of the type which is stalled at the limit of rocking motion of the tool shaft 8, stops being provided to engage a stop lug of the shaft at its limits of rocking motion. These stops are arranged to alternately present the two cutting edges of the double action tool to the work, the stall motor 12 holding the shaft rigidly against the stops so as to prevent any tool chatter during the cutting strokes, with the alternate cutting thrusts imposed directly upon the stops which are closely adjacent the cutting tool within the tool slide.

As noted above, the tool slide 10 is adjustable vertically with respect to the rail head 11 to adjust the cutting edges of the tool 7 with respect to the surface of the workpiece 4. During a surface planing operation, the tool slide is locked in its vertically adjusted position, and is fed in steps along the cross rail in time with the reciprocations of the table so as to progressively machine the work surface, one cut being made during each table stroke in forward and reverse directions. The tool slide is also provided with a clapper for mounting a finishing tool, as explained later, whereby the double action tool performs a rough cutting operation during forward and reverse reciprocations of the table, while the finishing tool provides a finishing cut during reciprocation in one direction only.

Planing Machine Operation

As indicated generally in FIGURES 1 and 2, the table motor 3 is energized in forward and reverse directions by an electrical control system which includes limit switches 13—13 at opposite ends of the bed, the switches being tripped by the table at its limits of motion, as indicated. The electrical control system also regulates the power feed mechanism of the rail head, and the stall motor 12 in time with the reciprocations of the table and workpiece. The limit switches 13 are mounted for adjustment relative to the bed to provide a predetermined amount of overtravel between the end of the workpiece and cutting tool at the limits of table reciprocation. The purpose of this clearance is to enable the rocking tool shaft to reverse the tool position so as to present the opposed cutting bits alternately to the workpiece without interference with the end of the workpiece.

When the left hand limit switch 13 is tripped (FIGURE 1) the control circuit is conditioned to reverse the table motor 3 so as to stop the table, then drive it in the opposite direction as indicated by the arrow in this view. At the same time, the stall motor 12 is also energized by the control system so as to rotate the rock shaft 8 and cutting tool 7 to bring one of the cutting bits 14 to cutting position facing the leading end of the work, as indicated in FIGURE 1. The feed motor is also energized at this time to shift the rail head 11 through a feeding step along the cross rail 6 so as to present the cutting bit to its new position transversely of the workpiece. After the rail head completes its feeding step, the leading end of the work reaches the cutting bit 14 and the table carries the workpiece through the cutting stroke to the position shown in FIGURE 2, at which point the right hand limit switch 13 is tripped.

At this point, the end of the workpiece will have travelled beyond the cutting tool, as indicated. When the switch is tripped, the table motor is again reversed, the feed motor is energized to feed the rail head to its new position, and the tool motor is energized to rock the tool shaft to bring the opposite cutting bit 14 to cutting position as indicated. This sequence of operations is carried out at each limit of table motion until the cutting tool has been fed in stepwise fashion across the entire surface of the work to be planed.

In order to present the opposed cutting bits 14 alternately to the cutting plane, the axis of the rocking tool shaft 8 is perpendicular to the longitudinal path travel of the workpiece. However, the axis of shaft 8 is inclined a few degrees from the perpendicular in relation to the transverse plane of the work, as indicated at A in FIGURE 5, the degree of angulation being exaggerated for illustration. It will be noted in this view, that the broken line 15 is perpendicular to the transverse plane of the work, while the broken line 16 represents the inclined axis of the tool shaft 8. The angular relationship of the shaft is brought about by adjusting the tool slide 10 angularly relative to the rail head 11.

Figure 6:
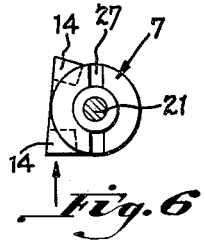
FIGURE 6 is a sectional view taken along line 6—6 of FIGURE 5, further illustrating the cutting tool in relation to the direction of motion of the workpiece.
Figure 7:
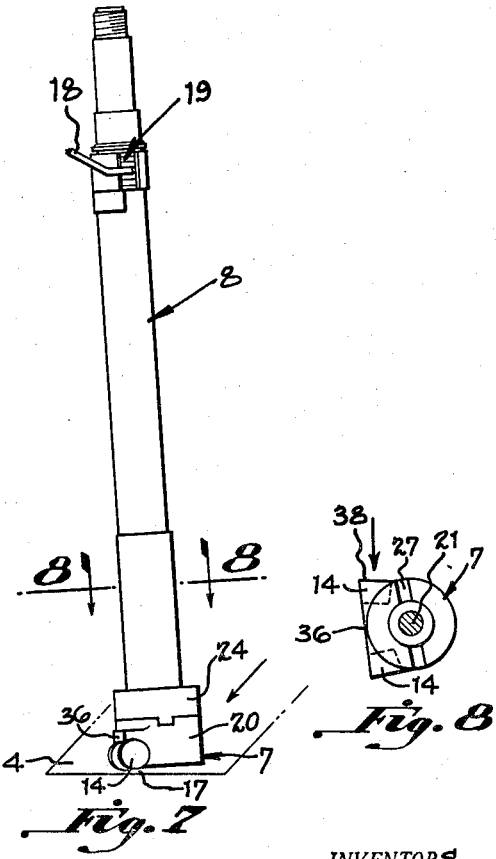
FIGURE 7 is a view similar to FIGURE 5, illustrating the position of the rocking tool shaft and tool while cutting during the return motion of the table.
Figure 8:
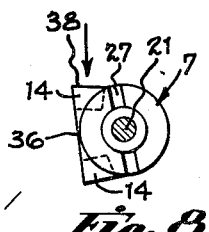
FIGURE 8 is a sectional view taken along line 8—8 of FIGURE 7, further illustrating the cutting tool in relation to the return motion of the workpiece.

As shown in FIGURES 5–8, the cutting edges of the bits 14 are disposed in a common, generally horizontal plane, but the transverse inclination of shaft 8 correspondingly inclines the plane of rotation of the bits. As shown in FIGURES 5 and 7, the bits are disposed on the low side of the cutting plane, as determined by the inclination of shaft 8, such that the cutting edge of one bit is shifted to a plane below the cutting edge of the opposite bit as the rocking motion is imparted in forward and reverse directions to shaft 8. The rocking motion not only presents the opposed bits alternately to the work but also provides clearance indicated at 17 (FIGURES 5 and 7), which prevents the non-cutting bit from dragging across the surface of the work, thereby to preserve the cutting edges. As viewed in FIGURES 6 and 8, the arrangement of the cutting bits 14 with respect to the tool 7 is such that it requires but a few degrees of rocking shaft motion to present the two bits alternately to cutting position. As illustrated in FIGS. 6 and 8, upon rotation of the shaft 8 through an arc of approximately 20°, the cutting edges alternately are disposed at right angles to the path of motion of the work, as indicated by the arrows in these views.

As shown in FIGURES 5 and 7, a link 18 is in driving connection with th stall motor 12, which as indicated above, may represent an electrically controlled air motor in place of the electrical motor shown in the co-pending application. As shown in these views, the link 18 is connected to the tool shaft 8 through a crank device, indicated generally at 19 projecting from shaft 8, such that the forward and reverse motions of the link impart rocking motion to the tool shaft.

Double Acting Tool

Figure 4:
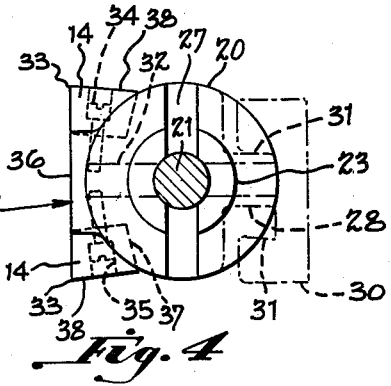
FIGURE 4 is a sectional view taken along line 4—4 of FIGURE 3, further detailing the double action tool.

The double acting cutting tool 7 shown in FIGURES 3 and 4 comprises a generally cylindrical tool holder or block 20 which is attached to the tool shaft 8 by a draw bar 21 which projects from a bore extending through the tool shaft. The draw bar is well known in the industry and is arranged to be rotated either by hand or by power. The tool holder 20 includes a threaded bore 22 (FIGURE 3) providing a threaded engagement with the lower portion of the draw bar. A centering boss 23, projecting from the upper surface of the tool holder, interfits a socket formed in the lower end of a head 24 which forms a part of the tool shaft 8. If the draw bar is hand operated, its lower end may include a hexagonal socket 25 (FIGURE 3) for the reception of a suitable wrench, whereby the draw bar is rotated manually to mount or demount the tool.

As best shown in FIGURE 3, the head 24 includes a transverse key 26 projecting downwardly from its lower surface or cutting face, and the upper surface or mounting face of the tool holder 20 is slotted as at 27 (FIGURE 4) to interfit the key. This arrangement locks the tool holder securely against rotation so as to resist the cutting thrusts which act upon the opposed cutting bits. As indicated in FIGURES 3 and 4, the stop lug of the tool shaft 8 is formed as at 28 in the upper portion of head 24, by appropriately machining away portions of the head. This lug or projection, as shown in broken lines in FIGURE 4, coacts with a hardened stop plate 30 having opposed abutment surfaces 31 against which the lug 28 engages in its alternate positions. By virtue of this arrangement, the cutting thrusts acting upon the bits are absorbed close to the point of application to eliminate tool chatter and to isolate the torque forces from the tool shaft.

The slot 27 of the tool holder shown in FIGURE 4 is arranged to present the cutting bits to the work in longitudinal planing operations, as shown in FIGURES 5–8. For cross planing, as disclosed in the co-pending application, the tool holder is rotated to a right angular position with respect to the shaft 8. For cross planing therefore, the tool holder is provided with a second slot 32, as indicated in broken lines (FIGURE 4), which is at right angles to the slot 27.

The cylindrical or button-type cutting bits 14 shown in FIGURES 3 and 4 are intended primarily for rough cutting since their cutting edges generate cuts which are slightly concave. Each cutting bit 14 tapers inwardly from its cutting edge 33 to provide the necessary cutting rake or clearance. The bits are made of a suitable hard material, such as carbide, and are detachably secured in position by respective screws 34 which are threaded into the tool holder from opposite sides, each bit having a counter-bore 35 which presents a shoulder engaged by the head of the screw.

As best shown in FIGURES 3 and 4, the tool holder 7 is provided with a lug portion 36 projecting outwardly from its cylindrical body and the body of the tool holder is provided with semi-cylindrical recess 37 at opposite sides leading to the lug portion 36. The recesses 37 are tapered and snugly embrace a portion of the bits 14 which are clamped rigidly against the opposite sides of the lug portion 36 by the screws 34. It will be noted in FIGURE 4, that the cutting faces 38 of the opposed bits diverge outwardly relative to the axis of the tool holder 20. This angulation presents the cutting faces at right angles to the direction of the travel of the work as the bits are alternately brought to cutting position, as noted earlier with respect to FIGURES 6 and 8.

Since the cutting bits 14 are cylindrical, they may be clamped in place with selected portions of their cutting edges presented to the work surface, and the cutting edges may be renewed from time to time simply by loosening the screws 34 and rotating the bits to new positions. If it is necessary to install new bits, the screws 34 are simply removed to permit replacement of the bits. These operations may be performed without dismounting the tool holder from the tool shaft 8 upon which it is mounted.

Double Acting Tools of Modified Construction

Figure 13:
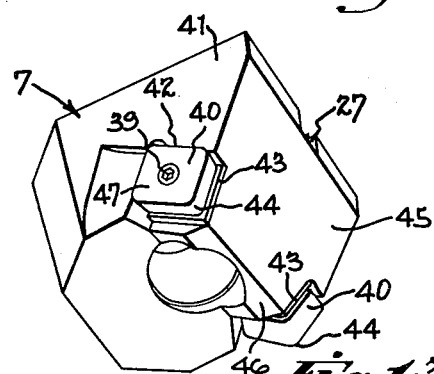
FIGURE 13 is a perspective view illustrating a double acting tool of slightly modified construction, wherein the demountable cutting bits are square in configuration, as distinguished from the cylindrical button type bits shown in FIGURES 3 and 4.
Figure 14:
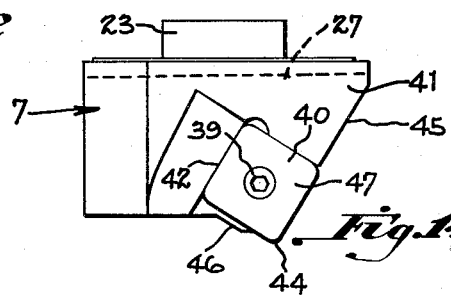
FIGURE 14 is a side view of the tool shown in FIGURE 13.

The cutting tool shown in FIGURES 13 and 14 is generally similar to the tool described above and differs primarily in that the opposed cutting bits, which are indicated at 40, are square in outline configuration. The tool block or holder 41 is provided with generally square recesses 42 at opposite sides to receive the square cutting bits 40, the bits being embraced at two sides by the recess 42 (FIGURE 14), leaving the adjacent two sides of the bit exposed. The bits 40 are clamped in the recesses by headed screws 39 seated in counter-bores formed in the bits, the shank of each screw being threaded into the holder, as described with reference to FIGURE 4. The bits preferably are seated upon respective hardened plates 43—43 (FIGURE 13) which interfit the recesses.

As viewed in FIGURE 14, the square bits are disposed in a diagonal position so as to present a rounded corner 44 to the workpiece, the rounded corner portion forming the cutting edge. The adjacent sides of the block 41 are inclined as at 45 and 46 corresponding with the configuration of the cutting bits. The sides of the cutting bits are tapered from the working face 47 rearwardly, as described above with reference to FIGURES 3 and 4, to provide the rake or working clearance.

The modified block 41 (FIGURE 14) includes at its upper surface a centering boss 23 and slot 27 for engagement with the head 24 of the tool shaft 8; it also includes a threaded bore for engagement by the draw, as described above.

Referring to FIGURES 15 and 16, the modified tool holder 49 shown therein, and also shown in the co-pending application, is provided with cutting bits 48 having straight side and bottom cutting edges 50. As shown in FIGURE 16 with the bit removed, one side of the holder includes a pair of generally square recesses 51 having hardened plates 52 secured in the recesses by screws 53.

The bits 48 are clamped in place by respective clamping blocks 54, each block having one end seated against the surface of the holder 49 and having its opposite end seated upon a flat 55 formed in the exposed side of the bit. Each clamping block is forced into clamping engagement with the bit by clamping screw 56 threaded into the holder at a point intermediate the length of the block. When the tool is in operation, the working face 57 of each bit resides substantially at right angles to the line of travel of the work as the bits alternately are rocked to cutting position.

Duplex Cutting

As noted earlier, the double cutting tool is also utilized in duplex cutting operations, as illustrated in FIGURES 9–12, wherein the double acting cutting tool coacts with a finishing tool. For this purpose, the tool slide 10 is provided with a clapper box 58 carrying a single acting finishing tool 60 which provides a finishing cut during work reciprocation in one direction only, while the double acting tool 7 provides a rough cut during reciprocation in both directions.

As shown in FIGURES 9 and 11, the workpiece 4 is travelling toward the right and the finishing tool 60 is taking a finishing cut, while one of the roughing bits 14 concurrently takes a rough cut as indicated. Upon completion of the stroke, the double acting tool is reversed as in FIGURES 10 and 12 to present the opposed bit, while the tool slide 10 shifts the clapper and finishing tool to a non-cutting position. At this point, while the end of the work is shifted beyond the cutting tools, the rail head and tool slide are fed transversely for the next roughing cut, as indicated by the broken lines in FIGURE 12.

After the feed motion, the table and work are advanced toward the left, to take the next rough cut, as shown in FIGURES 10 and 12, then the duplex cut of FIGURES 9 and 11 is repeated. It will be understood that the cutting edge of the finishing tool must be at least equal to two times the amount of cross feed in order to finish both rough cuts, with the finishing cuts overlapped sufficiently to provide a fine finish.

Having described our invention, we claim:

A double-cutting tool for a planer having a rocking tool shaft having an enlarged tool mounting head, said planer having a work support adapted to reciprocate a workpiece in a plane generally at right angles to the axis of the tool shaft, said double-cutting tool comprising a tool body having means for securing the tool body to said rocking tool shaft, said body having a solid generally polygonal outline configuration, said body having a mounting face adapted to be engaged against the tool mounting head, said body having a second face generally opposite and parallel to said mounting face, said body having a pair of opposed tool recesses formed in opposite sides thereof, said recesses opening into said second face, said recesses having respective axes disposed generally at right angles to the central axis of the tool body, said recess axes being displaced outwardly from said central axis, each of said recesses having inner bit supporting surfaces located symmetrically on opposite sides of said central axis, said bit supporting surfaces residing in planes which are spaced apart and which diverge outwardly in opposite directions from said central axis, respective cutting bits configured to interfit the bit supporting surface of said recesses, said cutting bits being mounted in said recesses and engaging said bit supporting surfaces, said bits having cutting edges projecting beyond the plane of said second face and facing generally in opposite directions from said shaft axis, the related spacing and angle of said diverging bit supporting surfaces being adapted to present the said opposed cutting edges alternately at substantially right angles to the path of relative reciprocating motion of a workpiece carried upon said work support in response to about 20° arcuate rocking motion of said tool shaft, whereby said opposed cutting edges are presented in alternate positions for cutting in both directions of movement of the workpiece.

References Cited in the file of this patent

UNITED STATES PATENTS

| | | |
|---|---|---|
| 1,248,201 | Swahlstedt | Nov. 27, 1917 |
| 1,466,355 | Dusenbury | Aug. 28, 1923 |
| 2,047,052 | Benzon | July 7, 1936 |
| 2,358,897 | Walter | Sept. 26, 1944 |
| 2,630,725 | Black | Mar. 10, 1953 |

FOREIGN PATENTS

| | | |
|---|---|---|
| 887,054 | France | July 26, 1943 |